(12) United States Patent
Turner

(10) Patent No.: US 10,259,261 B2
(45) Date of Patent: Apr. 16, 2019

(54) WHEEL

(71) Applicant: GKN Wheels Ltd., Redditch, Worcestershire (GB)

(72) Inventor: Paul Michael Turner, Telford (GB)

(73) Assignee: GKN Wheels Ltd., Redditch, Worcestershire (GB)

( * ) Notice: Subject to any disclaimer, the term of this patent is extended or adjusted under 35 U.S.C. 154(b) by 141 days.

(21) Appl. No.: 15/514,877

(22) PCT Filed: Jul. 30, 2015

(86) PCT No.: PCT/GB2015/052200
§ 371 (c)(1),
(2) Date: Mar. 28, 2017

(87) PCT Pub. No.: WO2016/051129
PCT Pub. Date: Apr. 7, 2016

(65) Prior Publication Data
US 2017/0239983 A1    Aug. 24, 2017

(30) Foreign Application Priority Data

Oct. 2, 2014    (GB) .................................. 1417463.5

(51) Int. Cl.
*B60B 23/12*    (2006.01)
*B60B 23/10*    (2006.01)
(Continued)

(52) U.S. Cl.
CPC .............. *B60B 23/12* (2013.01); *B60B 3/042* (2013.01); *B60B 3/044* (2013.01); *B60B 23/06* (2013.01); *B60B 23/10* (2013.01)

(58) Field of Classification Search
CPC ......... B60B 23/06; B60B 23/10; B60B 23/12; B60B 3/042; B60B 3/044
See application file for complete search history.

(56) References Cited

U.S. PATENT DOCUMENTS 1,639,108 A * 8/1927 Putnam ................... B60B 23/06
152/405
2,237,481 A * 4/1941 Casimiro ................ B60B 23/10
152/405

(Continued)

FOREIGN PATENT DOCUMENTS

EP    0911183    4/1999
EP    1174285    1/2002
(Continued)

*Primary Examiner* — Kip T Kotter
(74) *Attorney, Agent, or Firm* — Boyle Fredrickson, S.C.

(57) ABSTRACT

A wheel (10), including a rim (12) and a disc (14) by which the wheel (10) is attachable to a hub of a vehicle, the disc (14) being attachable to the rim (12) by means of generally axially extending fasteners (20), each of which passes through a respective opening (18) of the disc (14) and is received in a respective generally axially extending passage (24) provided in a connecting member (16) of the rim (12), wherein the wheel (10) also includes a spacer (40) having an axial depth to space the disc (14) from the connecting member (16) of the rim (12), the spacer (40) including an opening (42) through which a fastener (20) is receivable to connect the disc (14) to the connecting member (16) of the rim (10), and a locating member (44) which is receivable in a corresponding locating opening (26) in the connecting member of the rim (12).

10 Claims, 3 Drawing Sheets

(51) Int. Cl.
*B60B 3/04* (2006.01)
*B60B 23/06* (2006.01)

(56) References Cited

U.S. PATENT DOCUMENTS

| | | | | |
|---|---|---|---|---|
| 3,885,834 | A * | 5/1975 | Edwards | B60B 23/12 301/36.1 |
| 4,643,484 | A * | 2/1987 | Luter | B60B 23/12 301/11.1 |
| 5,938,291 | A * | 8/1999 | Pankhurst | B60B 23/12 301/10.1 |
| 6,027,176 | A * | 2/2000 | Kuhl | B60B 3/002 301/11.1 |
| 9,701,158 | B2 * | 7/2017 | Pellicano | B60B 23/00 |

FOREIGN PATENT DOCUMENTS

| | | | |
|---|---|---|---|
| EP | 1186442 A2 * | 3/2002 | B60B 3/002 |
| EP | 2607097 | 6/2013 | |
| GB | 2058686 | 4/1981 | |
| GB | 2167717 | 6/1986 | |
| JP | S59124703 U | 7/1984 | |
| WO | 2006/048155 | 5/2006 | |
| WO | 2006048155 | 5/2006 | |
| WO | 2010093236 | 8/2010 | |

* cited by examiner

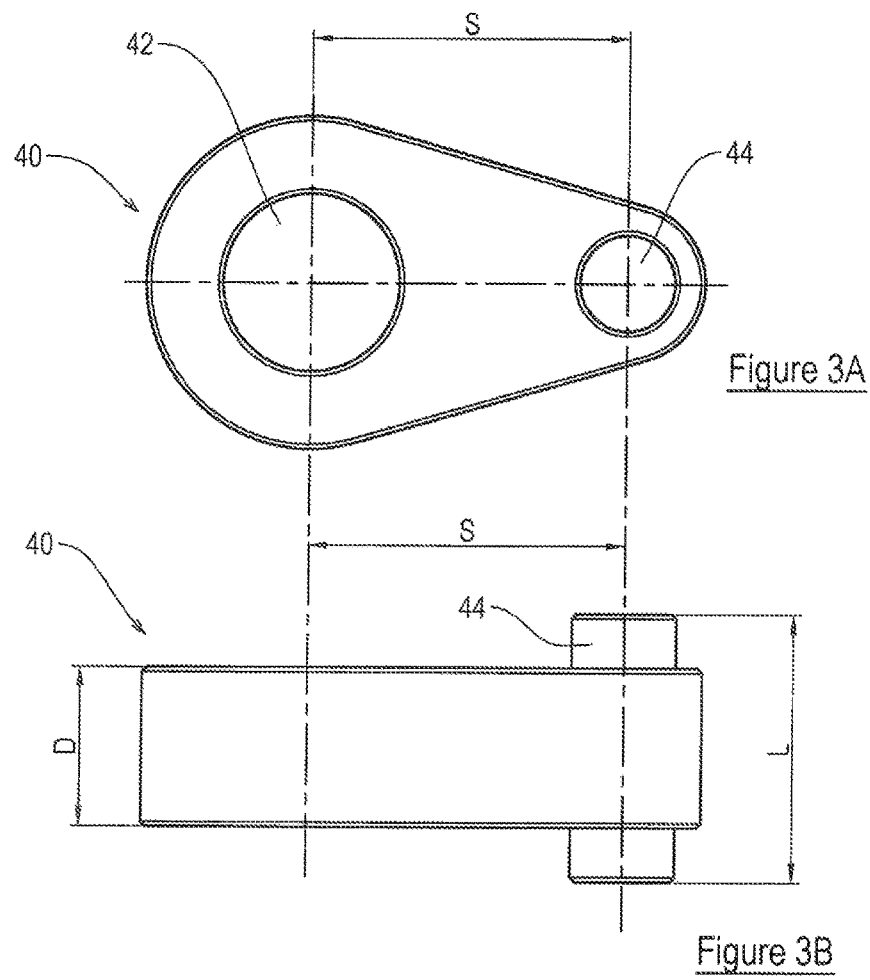
Figure 3A
Figure 3B
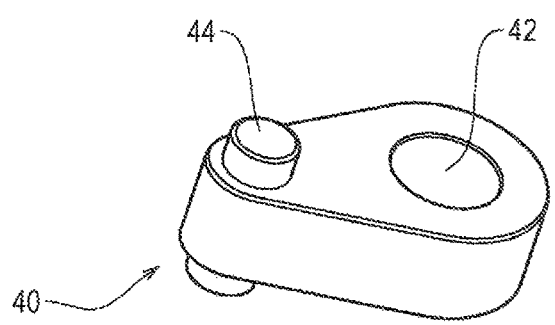
Figure 3C

WHEEL

This invention relates to a wheel of the kind having a rim and a disc releasably attached together. Such wheels are used for agricultural vehicles, for example tractors, so that the rim can be attached to the disc in alternative orientations, so that the distance between a pair of wheels on an axle can be varied to suit different agricultural applications.

It is known in the art to weld to the rim, around a radially inner circumferential surface thereof, one or more connecting members, and to attach the disc to the rim by bolting through the disc and the connecting member. It is known for the connecting member to be provided in the form of a ring. Discs are provided in either substantially circular form, or 'square' form, in which the outer perimeter of the disc includes flattened portions, which create gaps at intervals around the circumference of the connecting member. The choice of a circular or square disc is dependent on application load.

It is also known to provide one or more spacers between the disc and the ring, so that by removing the disc from the ring or in the form of circumferentially spaced lugs, and repositioning the disc and/or the or each spacer, the position of the disc relative to the wheel centre can be changed and the tractor track adjusted. A spacer is advantageous because it enables a longer bolt to be used than would be the case if the different positions or 'offsets' were provided by a shaped disc or ring alone. The longer the bolt that is used, the more 'stretch' that can be developed in the fixing of the disc to the rim. This additional stretch provides increased resistance of the bolt to loosening during service.

When wheels are required to be used on tractors which may run at 50 km/h or more, it is generally required that the highest point out of centre (first harmonic high spot), i.e. the furthest point on the circumference from the centre of the rim, is marked to enable the rim and a tyre to be matched when fitting the tyre to the rim. This is done by positioning a low spot marked on the tyre circumferentially adjacent the high spot marked on the rim. This smooths out eccentricity of the rim, at least to an extent, to provide improved comfort for the driver of the tractor.

A disadvantage of known adjustable or variable track wheels is that the high spot is marked in the factory. If a user dismantles and reassembles the assembly in the field, the disc may be rotated relative to the rim, and the overall high spot out of centre may change. Furthermore, tolerances, necessary clearances in fixing holes and gravity may also affect the position of the overall high spot. Therefore, the benefit achieved by matching the tyre to the rim may be lost when the track of the wheel is altered for the first time.

According to the present invention, there is provided a wheel, including a rim and a disc by which the wheel is attachable to a hub of a vehicle, the disc being attachable to the rim by means of generally axially extending fasteners, each of which passes through a respective opening of the disc and is receivable in a respective generally axially extending passage provided in a connecting member of the rim, wherein the wheel also includes a spacer having an axial depth to space the disc from the connecting member of the rim, the spacer including an opening through which a fastener is receivable to connect the disc to the connecting member of the rim, and a locating member which is receivable in a corresponding locating opening in the connecting member of the rim.

The locating member may be receivable in a corresponding opening in the disc.

The locating member may be a pin, for example a dowel pin or roll pin.

The locating member may have at least one of a different cross-sectional size and shape from the fasteners which are receivable in the or each passage of the connecting member and the or each opening of the disc.

The connecting member may include only one locating opening, such that the spacer is locatable in a single position relative to the connecting member and hence to the rim.

The disc may include a single corresponding opening, such that the disc is locatable in a single circumferential position relative to the connecting member and hence to the rim.

The disc may include a pair of locating openings, to permit the disc to be connected to the rim in two different orientations, but in a single rotational position relative to the connecting member and hence to the rim, with one or the other of the locating openings of the disc corresponding with the locating member of the spacer and the locating opening of the connecting member dependent upon the orientation of the disc relative to the rim.

The connecting member may include two locating openings, such that each one of a pair of spacers is locatable in a respective position relative to the connecting member and hence to the rim.

Where two locating openings are provided, the two locating openings may be positioned diametrically opposite one another on the connecting member of the rim.

Where two locating openings are provided, the two locating openings may be spaced circumferentially by approximately 90°.

The wheel may further include a third locating opening in the connecting member of the wheel rim, a corresponding locating opening in the rim and a respective spacer for locating the disc relative to the rim in a third position around the circumference of the rim.

According to a second aspect of the invention, there is provided a spacer for a wheel according to the first aspect of the invention.

The invention will now be described, by way of example only, with reference to the accompanying drawings, of which:

FIG. 3A is a cross-sectional view of a spacer of the wheel of FIGS. 1 and 2;

FIG. 3B is a second cross-sectional view of the spacer of FIG. 3A; and

FIG. 3C is a perspective view of the spacer of FIGS. 3A and 3B.

Figure 1:
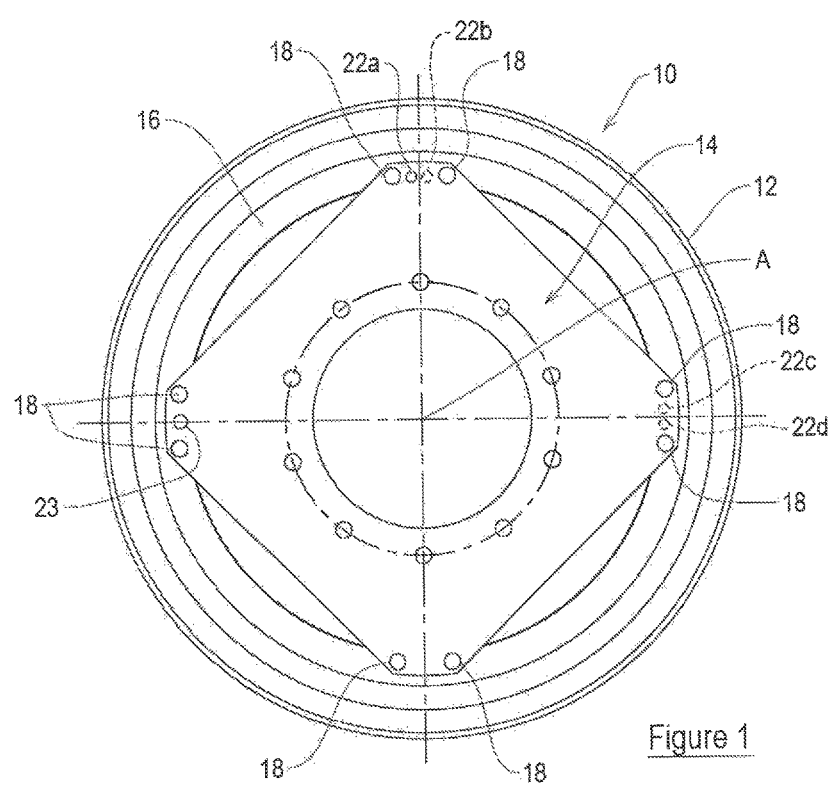
FIG. 1 is a side view of a wheel in accordance with the present invention.

Referring to the drawings, there is provided a wheel 10, a part of which is shown in FIG. 1. The wheel 10 includes a rim 12 which is adapted to receive a tyre (not shown), and a disc 14 by which the wheel 10 can be attached to a hub of a vehicle. The wheel 10 also includes a connecting member 16 which is permanently attached to the rim 12, for example by welding, and to which the disc 14 is connectable. The wheel 10 has an axis of rotation A, which for the purposes of describing the wheel 10 is considered to be substantially horizontal. When used herein, the term 'axial' should be construed as substantially parallel to the axis A.

The disc 14 shown in FIG. 1 is generally 'square' with the corners of the square being truncated so as to provide a generally octagonal shape, having alternating long and short sides. The disc 14 may, alternatively, be substantially circular in shape. The disc 14 includes a plurality of substantially axially extending openings 18 through each of which a fastener 20 is receivable. In the present example, the disc 14 includes eight openings 18, two provided at each truncated corner of the square. It will be appreciated that the disc may include more or fewer openings as appropriate. Where the disc 14 is substantially circular, the openings 18 are spaced around the circumference of the disc 14, preferably with pairs of openings 18 spaced around the circumference of the disc 14, for example four pairs of openings 18 spaced at approximately 90° from one another. Again, it will be appreciated that any number of openings 18 may be provided in any appropriate arrangement. The disc 14 also includes a substantially axially extending locating opening 22a, which is positioned adjacent one of the openings 18, the purpose of which will be described in more detail below.

In the example shown in FIG. 1, the connecting member 16 is a substantially continuous ring which is attached around its circumference to the rim 12. In alternative embodiments, the connecting member 16 may include a plurality of lugs which are circumferentially spaced around the circumference of the rim 12. The connecting member 16 includes a plurality of substantially axially extending openings or passages 24 in which a fastener 20 is receivable. The connecting member 16 also includes a substantially axially extending locating opening 26. In an embodiment, the locating opening 26 is adjacent one of the openings 24. The distance between the centre of the locating opening 26 and the centre of the adjacent opening 24 is approximately 30 mm. It will be appreciated that this distance may be altered as appropriate.

Each fastener 20 includes a bolt 28, which is receivable through a respective opening 18 in the disc 14 and a respective opening 24 in the connecting member 16 to enable the fastener 20 to attach the disc 14 to the connecting member 16 of the rim 12. Each fastener 20 also includes a nut 30 and a washer 32.

The wheel 10 also includes a spacer 40. The spacer 40 includes an opening 42 through which a fastener 20 is receivable. The opening 42 is approximately 16.5 mm in diameter, but it will be appreciated that the dimensions of the opening 42 will depend upon the dimensions of the fastener 20 with which the spacer 40 is intended to co-operate. The spacer 40 also includes a locating member 44. In the example shown, the locating member 44 is a pin which extends through the spacer 40, so as to protrude from either side of the spacer 40. The locating member 44 acts as a centring pin, and in the present example takes the form of a dowel pin. Alternatively, the locating member 44 may be a different type of pin, for example a roll pin. The locating member 44 may be formed in an alternative way, provided the locating member 44 protrudes from both sides of the spacer 40. The locating member 44 has an overall length L of between approximately 23 mm and approximately 27 mm, and preferably approximately 25 mm. It will be appreciated that other lengths L of the locating member 44 may be desirable and appropriate. The locating member 44 is substantially circular in cross-section and is approximately 10 mm in diameter, but it will be appreciated that other shapes and sizes may be appropriate. The spacer 40 is substantially oval in cross-section. The spacer 40 has a depth D of approximately 15 mm. It will be appreciated that other depths D of the spacer 40 may be desirable and appropriate. The centres of the opening 42 and the locating member 44 are spaced by a distance S, of approximately 30 mm.

In use, the disc 14 is connected to the rim 12 by insertion of the bolt 24 of a fastener 20 through an opening 24 in the connecting member 16, through the opening 42 in the spacer 40 and through a corresponding opening 18 in the disc 14. The nut 30 and the washer 32 of the fastener 20 are attached to the bolt 24. The spacer 40 is thus sandwiched between the disc 14 and the connecting member 16 of the rim 12. The locating member 44 of the spacer 40 is received in the locating openings 22a and 26 of the disc 14 and the connecting member 16, respectively.

Additional fasteners 20 are inserted through the other openings 18, 24 of the disc 14 and the connecting member 16, respectively, to hold the disc 14 in position with respect to the rim 12, around the circumference of the rim 12. It will be appreciated that since only one set of locating holes 22a and 26 is provided in the disc 14 and the connecting member 16, respectively, it is possible to place the spacer 40 in only one position with respect to the rim 12, and in one position with respect to the disc 14. Therefore, the disc 14 may only be positioned in one rotational position with respect to the rim 12. Further spacers 50, which have only a central opening 52 for receiving a fastener 20, may be provided between the disc 14 and the connecting member 16 at other locations around the rim 12, such that the disc 14 is spaced substantially evenly from the rim 12 around the circumference of the rim 12.

Figure 2:
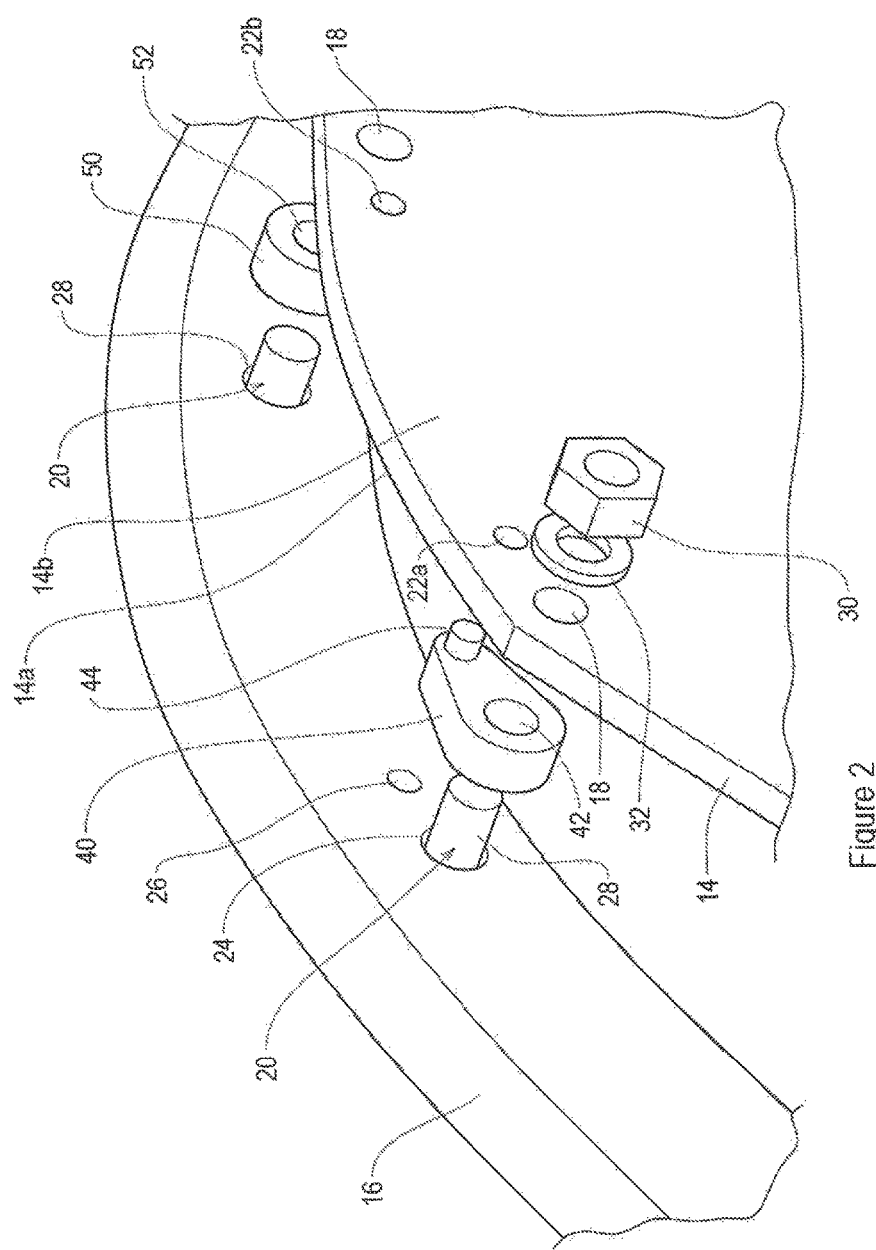
FIG. 2 is an illustrative perspective view of a part of the wheel of FIG. 2.

It may be desirable to enable the disc 14 to be able to be fixed to the rim 12 in an alternative orientation, for example with the disc 14 rotated through 180° about a substantially vertical axis. In FIGS. 1 and 2, the disc 14 is shown with a first face 14a adjacent the connecting member 16. If the disc 14 is rotated through 180° about a substantially vertical axis, into a second orientation relative to the rim 12, a second face 14b of the disc 14 will be positioned adjacent the connecting member 16. In order to enable the spacer 40 to be suitable for use with the disc 14 in two different orientations relative to the rim 12, it is necessary to provide a second locating opening 22b in the disc 14. The locating member 44 of the spacer 40 is receivable in one of the locating openings 22a, 22b, dependent upon the orientation of the disc 14 relative to the rim 12.

The provision of a single locating opening 26 in the connecting member 16 still ensures that the disc 14 can only be located in a single rotational position relative to the rim 12, despite the orientation of the disc 14 having been altered. A second spacer 40 may be provided for use in connecting the disc 14 to the rim 12. In order to allow the use of a second spacer 40, it is necessary to provide an additional locating opening 26 in the connecting member 16. Preferably this additional locating opening 26 is spaced approximately 90° around the connecting member 16 (or on an adjacent lug) In order to enable the second spacer 40 to be connected between the connecting member 16 and the disc 14, it is also necessary to provide corresponding locating openings 22c, 22d in the disc 14. Spacing the additional locating openings 22c, 22d at approximately 90° circumferentially around the disc 14 from the locating openings 22a, 22b means that it is not possible for a user to inadvertently rotate the disc 14 relative to the rim 12 during reassembly and still be able to correctly position and fix both spacers 40. Rotating the disc 14 through 90° relative to the rim 12 would mean that the locating member 44 of only one spacer 40 which was connected to the disc 14 would be positioned adjacent a locating opening 26 in the connecting member 16.

It is envisaged that it may be desirable to position the additional locating openings 22c, 22d, 26 spaced approximately 180° from the respective locating openings 22a, 22b, 26 in the disc 14 and the connecting member 16, respectively.

As an alternative to providing a two locating openings 22 in the disc 14 to enable the disc 14 to be positioned in two different orientations relative to the rim 12, it is envisaged that a single locating opening 23 may be positioned substantially equidistantly between two openings 22 in the disc 14. Similarly, the locating opening 26 in the connecting member 16 which corresponds with the locating opening 23 of the disc 14 for receiving the locating member 44 of the spacer 40 may be positioned substantially equidistantly between adjacent openings 24 in the connecting member 16 for receiving a fastener 20. With such an arrangement, it is necessary to provide a spacer 40 which has a distance S between the centre of the locating member 44 and the centre of the opening 42 which is approximately half the distance between adjacent openings 18, 24 of the disc 14 and the connecting member 16, respectively. This arrangement allows the disc 14 to be provided in two different orientations relative to the rim 12 without having to provide additional locating openings in the disc 14.

The provision of the spacer 40 which acts as a centring device to accurately locate the disc 14 with respect to the rim 12 is advantageous in that it reduced the number of parts required to space the disc 14 from the rim 12 by an appropriate amount and to ensure appropriate rotational positioning of the disc 14 with respect to the rim 12, when reassembling the wheel 10. The locating spacer 40 ensures that there are only a discrete number of positions in which the disc 14 can be located 12 with respect to the rim 12, to minimise the change of the position of the maximum distance out of centre of the wheel 10 when reassembling the wheel 10. It is possible for at least eight track variations or 'offsets' to be provided by the wheel 10 including the spacer 40 as described above; i.e.

1) the disc 14 can be positioned with the first surface 14a adjacent the connecting member 16;
2) the disc 14 can be positioned with the second surface 14b adjacent the connecting member 16;
3) the disc 14 can be mounted on an opposite face of the connecting member 16, with the first surface 14a of the disc 14 adjacent the connecting member 16;
4) the disc 14 can be mounted on the opposite face of the connecting member 16, with the second surface 14b of the disc 14 adjacent the connecting member;
5-8) the above orientations are also possible with the entire wheel 10 mounted in a different orientation relative to the hub of the vehicle; i.e. the wheel 10 is rotated though 180° about a substantially vertical axis relative to the hub.

The wheel 10 is described as having the or each spacer 40 positioned between the connecting member 16. However, if the or each spacer 40 were positioned adjacent the disc 14, but not between the disc 14 and the connecting member 16, this would provide a further eight offsets of the rim 12 relative to the hub of the vehicle.

It is not possible for the disc 14 to be rotated circumferentially relative to the rim 12 during reassembly and for the or each spacer 40 to be fixed in the correct location, since the new position(s) of the locating member(s) would not correspond with the positions of the respective locating opening(s) 26 of the connecting member 16. A further advantage of the present invention is that the locating member 44 of the spacer 40 is permanently attached to the spacer 40, thus reducing the risk of the locating member 44 being misplaced, for example during dismantling and reassembly of the wheel 10.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A wheel, including a rim and a disc by which the wheel is attachable to a hub of a vehicle, the disc being attachable to the rim by means of generally axially extending fasteners, each of which passes through a respective opening of the disc and is received in a respective generally axially extending passage provided in a connecting member of the rim, wherein the wheel also includes a spacer having an axial depth to space the disc from the connecting member of the rim, the spacer including an opening through which at least one of the fasteners is receivable to connect the disc to the connecting member of the rim, and a locating member which is receivable in a corresponding locating opening in the connecting member of the rim, wherein the locating member is receivable in a corresponding opening in the disc.

2. A wheel according to claim 1 wherein the locating member is a pin.

3. A wheel according to claim 1 wherein the locating member has at least one of a different cross-sectional size and shape from the fasteners which are receivable in the respective passage of the connecting member and the respective opening of the disc.

4. A wheel according to claim 1 wherein the connecting member includes only one locating opening, such that the spacer is locatable in a single position relative to the connecting member and hence to the rim.

5. A wheel according to claim 4 wherein the disc includes a single corresponding opening, such that the disc is locatable in a single circumferential position relative to the connecting member and hence to the rim.

6. A wheel according to claim 4 wherein the disc includes a pair of locating openings, to permit the disc to be connected to the rim in two different orientations, but in a single rotational position relative to the connecting member and hence to the rim, with one or the other of the locating openings of the disc corresponding with the locating member of the spacer and the locating opening of the connecting member dependent upon the orientation of the disc relative to the rim.

7. A wheel according to claim 1, wherein the wheel includes a pair of spacers, and wherein the connecting member includes two locating openings, such that each one of the pair of spacers is locatable in a respective position relative to the connecting member and hence to the rim.

8. A wheel according to claim 7 wherein the two locating openings are positioned diametrically opposite one another on the connecting member of the rim.

9. A wheel according to claim 7 wherein the two locating openings are spaced circumferentially by approximately 90°.

10. A wheel according to claim 7 further including a third locating opening in the connecting member of the wheel rim, a corresponding locating opening in the rim and a respective spacer for locating the disc relative to the rim in a third position around the circumference of the rim.

* * * * *